Figure 1:
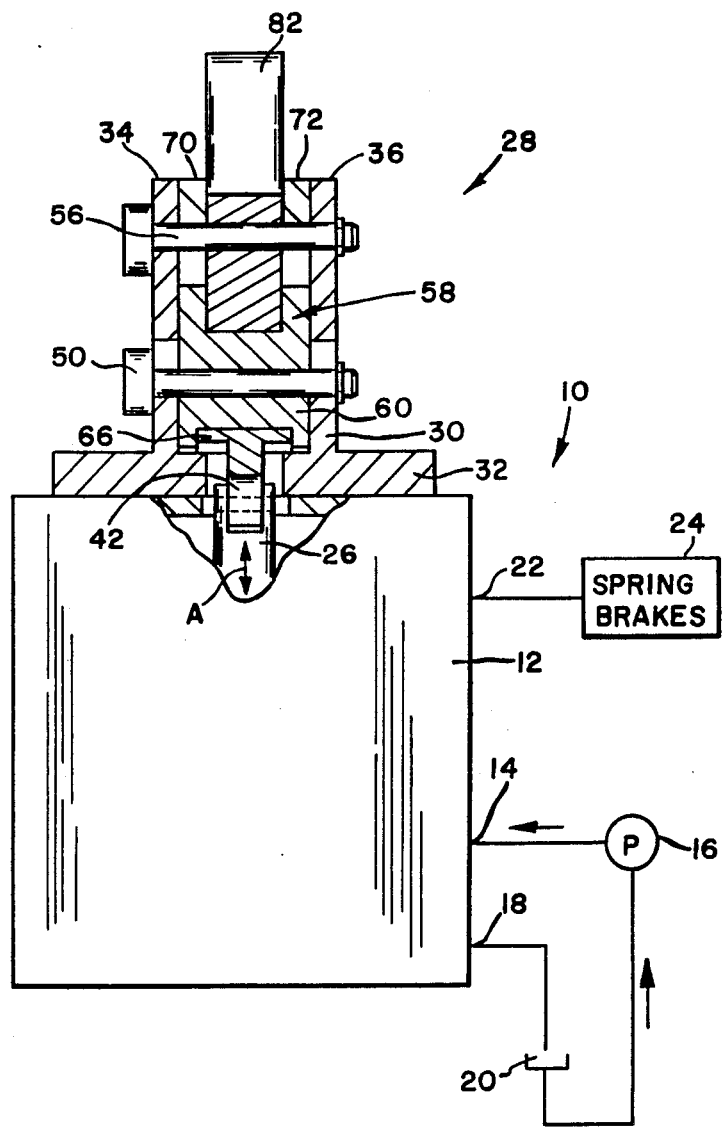

United States Patent [19]

Johnson

[11] Patent Number: 4,979,783

[45] Date of Patent: Dec. 25, 1990

[54] PARKING BRAKE CONTROL VALVE DUAL ACTUATING DEVICE

[75] Inventor: Duane R. Johnson, Wellington, Ohio

[73] Assignee: Allied-Signal Inc., Morristown, N.J.

[21] Appl. No.: 378,740

[22] Filed: Jul. 12, 1989

[51] Int. Cl.$^5$ .................. B60T 15/16; B60T 13/18
[52] U.S. Cl. ................... 303/9.61; 74/479;
303/10; 303/13; 192/4 A
[58] Field of Search .................. 303/9.61, 7, 8, 13,
303/15, 9.69, 9.72, 54, 71; 188/105, 151 A, 112
R; 74/479; 192/4 R, 4 A, 8 R, 8 Z, 7; 251/294;
137/637, 637.1

[56] References Cited

U.S. PATENT DOCUMENTS

| | | | |
|---|---|---|---|
| 2,164,692 | 7/1939 | Bahr | 74/479 |
| 2,310,802 | 2/1943 | Mercier | 303/9.61 |
| 2,366,173 | 1/1945 | Boldt | 303/9.61 |
| 2,725,129 | 11/1955 | Martin | 192/4 A |
| 3,136,399 | 6/1964 | Granryd | 192/4 A |
| 3,635,317 | 1/1972 | Crabb et al. | 192/4 A |
| 4,211,314 | 7/1980 | Clason | 192/4 A |
| 4,350,227 | 9/1982 | Knoche | 74/479 |
| 4,454,936 | 6/1984 | Wise | 192/4 A |
| 4,875,563 | 10/1989 | Larson et al. | 192/4 A |

FOREIGN PATENT DOCUMENTS 694022 7/1940 Fed. Rep. of Germany ........ 74/479

Primary Examiner—Matthew C. Graham
Attorney, Agent, or Firm—Ken C. Decker; William N. Antonis

[57] ABSTRACT

A control valve for a vehicle parking brake system is controlled by a pair of camming mechanisms, one of which is controlled by the shift lever of the vehicle automatic transmission and the other of which is controlled by a manual control knob in the vehicle operator's compartment. Camming mechanisms control the valve such that the parking brakes on the vehicle are always applied when the shift lever is disposed in the "Park" position, but the vehicle parking brakes can be applied or released manually by manipulation of the control knob when the shift lever is placed in one of the other positions other than the "Park" position along the shift quandrant of the automatic transmission.

10 Claims, 2 Drawing Sheets

PARKING BRAKE CONTROL VALVE DUAL ACTUATING DEVICE

This invention relates to a control mechanism for a valve for controlling communication of fluid pressure in a vehicle braking system.

Many medium duty vehicles, such as medium weight trucks, motorhomes, school buses, etc. are equipped with hydraulic service brakes and are large enough that they are equipped with spring actuated parking brakes. The spring actuated parking brake actuators used on such vehicles are released by hydraulic pressure When the vehicle is parked, the hydraulic pressure is vented from the actuators, permitting the springs to effect a parking application and when the vehicles is to be moved, hydraulic pressure is communicated to the actuators to provide hold-off pressure opposing the actuating springs, thereby effecting parking brake release. Many of these vehicles, such as motor homes and rental trucks, are commonly equipped with automatic transmissions and are operated by drivers who do not normally operate vehicles of this weight. Accordingly, these non-professional drivers are used to parking vehicles by merely moving the automatic transmission lever to the 'Park' position, and may not normally effect a parking brake application. Since the parking pall within the automatic transmission is insufficient to hold these vehicles on some grades, it is desirable to automatically effect a parking brake application when the automatic transmission lever is moved to the 'Park' position. However, it is also necessary to enable the driver to effect a parking brake application independently of the position of the automatic transmission lever.

One valve which may be used to control fluid pressure in such a vehicle hydraulic parking brake system is disclosed in co-pending U.S. Pat. application No. 313,788, filed Feb. 23, 1989. The valve disclosed in this patent application effects parking brake actuation and release by movement of an actuating plunger which projects from the valve housing. Since, as discussed above, actuation of the vehicle parking brakes is desirable either automatically upon movement of the transmission lever to the 'Park' position or manually through a manual control knob in the driver's compartment, it is necessary to either have two such hydraulic control valves in series or to effect actuation of a single hydraulic control valve from two different sources. Providing two valves in series requires complex plumbing, is expensive, and it is difficult to package two valves in the limited space available. Actuating one valve from two separate actuators has heretofor required complex mechanical logic.

Figure 2:
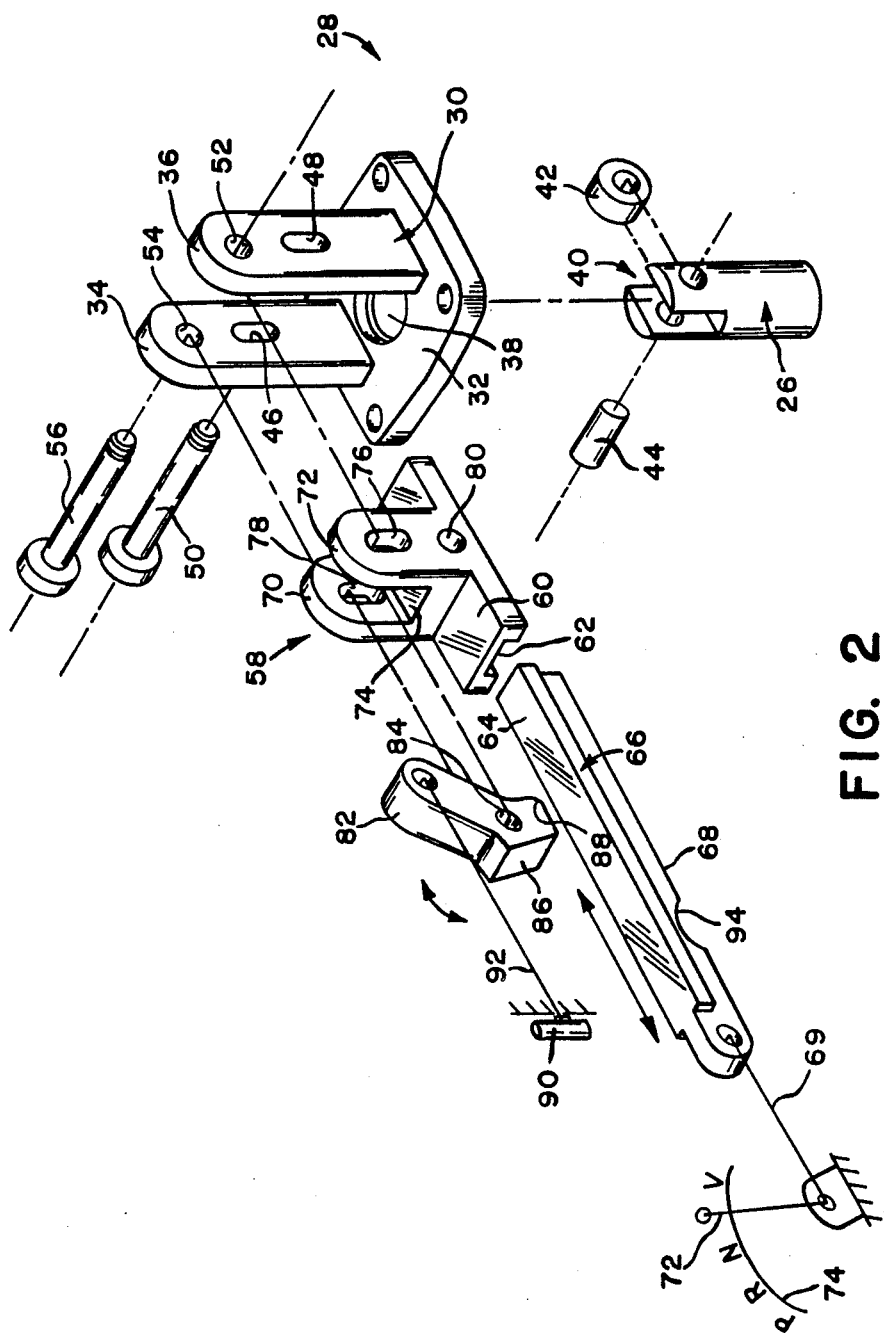

The present invention solves the aforementioned Problem by permitting actuation of a single valve from two different locations, through a relatively simple actuating mechanism. This and other advantages of the present invention will become apparent from the following description, with reference to the accompanying drawings, in which;

FIG. 1 is a schematic illustration of vehicle parking brake system, with a control mechanism according to the present invention illustrated in cross-section; and FIG. 2 is an exploded view of the mechanism to actuate the valve illustrated in FIG. 1.

Referring now to the drawings, a vehicle hydraulic parking brake control system generally indicated by the numeral 10 includes a valve illustrated schematically as at 12 which has an inlet 14 communicated to the outlet or high pressure side of a conventional hydraulic pump 16 and an outlet or drain port 18 communicated to a reservoir 20, which is communicated to the inlet or low pressure side of the pump 16. Valve 12 may be of the type disclosed in co-pending U.S. Pat. application No. 313,788, filed Feb. 23, 1989 Valve 12 also includes port 22 which communicates with conventional spring brake actuators 24.

Valve 12 is operated by a plunger 26 which projects from the upper surface of the valve 12 (viewing FIG. 1). The plunger 26 may be moved in a predetermined direction indicated by the arrow A. In its lowermost position (viewing FIG. 1), the valve 12 communicates pressure developed by the pump 16 to the spring brakes 24 through port 22, thereby supplying a hold-off pressure to the spring brakes to release the latter, thereby permitting the vehicle to be operated. In the uppermost position of the plunger 26, the pressure in spring brakes 24 is vented through port 18 to the reservoir 20, thereby permitting the spring brakes to be applied, to immobilize the vehicle upon which the system 10 is mounted.

The plunger 26 is actuated by an actuating mechanism generally indicated by the numeral 28. Actuating mechanism 28 includes a yoke 30 which is mounted on the valve 12 and which includes a base 32 which supports uprights 34, 36. An aperture 38 is provided in the base 32 for receiving the plunger 26. The upper end (viewing FIGS. 1 and 2) of the plunger 26 is bifurcated as at 40 to receive a cam follower 42 which is rotatably mounted on axle 44 carried by the plunger 26.

Uprights 34, 36 are provided with elongated openings 46, 48 which receive a substantially cylindrical pivot pin 50. Because the openings 46, 48 are elongated, pivot pin 50 is permitted to move relative to the uprights 34, 36, toward and away from the base 32. Uprights 34, 36 are also provided with aligned, substantially cylindrical openings 52, 54 which receives a substantially cylindrical pivot pin 56. Since the openings 52, 54 are only slightly larger than the pivot pin 56, the pivot pin 56 is restrained against substantial movement with respect to the yoke 30.

Assembly 28 also includes a saddle generally indicated by the numeral 58. Saddle 58 includes a base 60 which is received between the uprights 34, 36 of the yoke 30. Base 60 is provided with a groove 62 which slidably receives an upper rail 64 of sliding cam generally indicated by the numeral 66. Sliding cam 66 further includes a camming surface 68 which, when the saddle is installed on the yoke 30, slides between the saddle and the base 32 of the yoke 30 in engagement with the cam follower 42 of the plunger 26. Since plunger 26 projects through the opening 38, cam follower 42 engages the camming surface 68 of sliding cam 66. The end of sliding cam 66 is attached, via a linkage 70, to an automatic transmission shifting lever, illustrated schematically as at 72. As indicated, the lever 72, can be moved between the 'Park', 'reverse', and the other positions of the automatic transmission shift quadrant 74.

Mounted on the base 60 of saddle 58 is an assembly including a pair of uprights 70, 72 and a camming area 74 extending between the uprights 70, 72. The uprights 70, 72 are provided with elongated openings 76, 78 that are aligned with the cylindrical openings 52, 54 on the uprights 34, 36 when the saddle 60 is installed between the uprights 34, 36. The elongated openings 76, 78, receive the pin 56. Saddle 60 is also provided with a substantially cylindrical opening 80, which is aligned with the elongated openings 46, 48 of the uprights 34, 36 when the saddle 60 is installed on the yoke 30. The cylindrical opening 80 receives the pin 50. Accordingly, the saddle 60 is able to reciprocate vertically (viewing FIG. 1) with respect to the yoke member 30, because of the elongated openings 46, 48, 76, and 78. The range of movement of the saddle 60 is limited by the degree of elongation of the aforementioned openings 46, 48, 76, 78. It will be noted that this reciprocation is permitted only because the elongated openings 76, 78 are aligned with the cylindrical openings 52, 54, permitting the saddle to move with respect to the pin 56, and because the cylindrical opening 80 is in alignment with the elongated openings 46, 48, permitting the saddle 60 to move the pin 50 relative to the uprights 34, 36.

A camming lever 82 is provided with a cylindrical opening 84 which receives the pin 56 when the lever 82 is installed on the saddle 60 between the uprights 70, 72 and the saddle 60 is installed on the yoke 30 with the uprights 70, 72 between the uprights 34, 36 of the yoke 30. Since the cylindrical opening 84 is aligned with the cylindrical openings 52, 54, lever 82 can only pivot on the pin 56. However, because pin 56 extends through elongated openings 76, 78 of the saddle 60, the saddle 60 is capable of moving relative to the lever 82 and uprights 34, 36 for the aforementioned limited degree of movement established by the elongation of the openings 76, 78. Lever 82 further includes camming areas 86, 88, both of which are adapted to engage the camming area 74 as the lever 82 is rotated about the pin 56. It will be noted that the area 86 is offset from the axis of the opening 84 by a distance less than the distance that the area 88 is offset from the axis of opening 84. Accordingly, when the lever 82 is rotated about pivot pin 56 to a position disposing the surface 86 adjacent the surface 74, the elongation of the opening 76, 78 permits the saddle 58 to move away from the base 32 of the yoke 30, but when the lever 82 is rotated to bring the camming area 88 against the camming area 74, the saddle 58 is held in its position closest to the base 32 of the yoke 30. Lever 82 is connected to a control knob illustrated schematically as at 90 in the vehicle operator's compartment through a linkage 92.

In operation, it will be noted that when the shift lever 72 is disposed in the 'Park' position, the detent 94 in the camming surface 68 will be disposed over the cam follower 42, thereby disposing the plunger 26 in its uppermost position, regardless of the position of the lever 82. It will be remembered, of course, that in its upwardmost position, plunger 26 causes the valve 12 to vent the pressure in spring brakes 24 to the reservoir 20, thereby effecting a parking brake application. When the lever 72 is moved out of the park position into one of the other positions on the shift quadrant 74, the detent 94 is moved away from the cam follower 42 and the latter engages the surface 68 of the sliding cam 66. When the follower 42 engages the surface 68, the plunger 26 can be either in its upward or downward position, viewing the figures, depending upon the position of the lever 82, which is controlled by manual control knob 90 in the vehicles operator's compartment. When the lever 82 is in the position disposing the camming area 88 over the camming area 74 on the saddle 58, the saddle 58 is held in its lowermost position. Since the saddle then holds the sliding cam 66 in its lower position above the base 32, and the cam follower 42 is engaged with the surface 68, the plunger 26 is held in its lower position, in which it communicates fluid pressure from pump 16 to the spring brakes 24, thereby effecting spring brake release. However, when the lever is rotated by operation of the knob 90 to a position disposing the camming surface 86 against the surface 74, the saddle 58 is permitted to move with respect to the yoke assembly 30. Since the plunger 26 is spring loaded, the plunger 26 forces the sliding cam 66 and the saddle 58 away from the base 32, so that the plunger 26 is disposed in its upward position, in which fluid pressure is vented from spring brakes 24, thereby effecting a parking brake application. Accordingly, it will be noted that when the automatic transmission is place in the 'Park' position, the plunger 26 will always be in its uppermost position (thereby effecting a spring brake application) because of the detent 94, regardless of the Position of the lever 82. However, when the lever 72 is moved out of the 'Park' position thereby disposing the camming surface 68 in engagement with the follower 42, the plunger can be moved between its upward and lower position by operation of the lever 82, thereby permitting the vehicle operator to either effect or release a parking brake application by manipulation of the knob 90 as long the transmission lever 72 is positioned along the quadrant 74 in a position other than the 'Park' position.

I claim:

1. Control mechanism for vehicle braking system including a valve for controlling communication of fluid pressure in said braking system, said valve including a plunger for actuating said valve, said plunger being movable along a predetermined direction between brake applied and brake released positions, and a pair of camming mechanisms for moving said plunger between said brake applied and brake released positions, one of said camming mechanisms being movable from a condition disposing said plunger in the brake applied position to a condition disposing said plunger in the brake released position, the other camming mechanism including means cooperating with the one camming mechanism to move the plunger between the brake applied and brake released positions when the one camming mechanism disposes the plunger in the brake released position, said one camming mechanism including a surface for slidably engaging said plunger and being movable along a predetermined path in a direction other than said predetermined direction.

2. Control mechanism for vehicle braking system as claimed in claim 1, wherein a detent is provided in said sliding surface for engagement with said plunger, said plunger moving to said brake applied position when the one camming mechanism is moved to a position bringing said detent into registry with the plunger.

3. Control mechanism for vehicle braking system as claimed in claim 2, wherein said one camming mechanism is actuated by a control operating an automatic transmission and said lever is operated manually.

4. Control mechanism for vehicle braking system as claimed in claim 1, wherein said other camming means includes means for moving said one camming means and said plunger along said predetermined direction.

5. Control mechanism for vehicle braking system as claimed in claim 4, wherein said means for moving said one camming means includes a pivotally mounted lever, said lever having a camming area causing movement of the one camming means in said predetermined direction whereby said plunger may be operated by said lever through the one camming means.

6. Control mechanism for vehicle braking system including a valve for controlling communication of fluid pressure in said braking system, said valve including a plunger for actuating said valve, said plunger being movable along a predetermined direction between brake applied and brake released positions, and a pair of camming mechanisms for moving said plunger between said brake applied and brake released positions, one of said camming mechanisms being movable from a condition disposing said plunger in the brake applied position to a condition disposing said plunger int he brake released position, the other camming mechanism including means cooperating with the one camming mechanism to move the plunger between the brake applied and brake released positions when the one camming mechanism disposes the plunger in the brake released position, said other camming means including means for moving said one camming means and said plunger along said predetermined direction, said means for moving said one camming means including a pivotally mounted lever, said lever having a camming area causing movement of the one camming means in said predetermined direction whereby said plunger may be operated by said lever through the one camming means, said other camming means including a saddle movable in said predetermined direction in response to movement of the camming area caused by operation of the lever, said saddle engaging the one camming means to move the latter in the predetermined direction.

7. Control mechanism for vehicle braking system as claimed in claim 6, wherein said saddle defines a groove slidably receiving the one camming means to permit movement of the latter relative to a saddle in said predetermined path.

8. Control mechanism for vehicle braking system as claimed in claim 7, wherein said camming mechanisms include a yoke mounted on said valve, said yoke defining an opening receiving said plunger, said saddle being slidably mounted on said yoke for movement in said predetermined direction, said lever being pivotably mounted on said yoke for moving said saddle in said predetermined direction upon pivoting of said lever.

9. Control mechanism for vehicle braking system as claimed in claim 8, wherein said one camming mechanism is actuated by a control operating an automatic transmission and said lever is operated manually.

10. Control mechanism for vehicle braking system as claimed in claim 8, wherein said one camming mechanism includes a surface for slidably engaging said plunger and being movable along a predetermined path in a direction other than said predetermined direction, a detent in said sliding surface for engagement with said plunger, said plunger moving to said brake applied position when the one camming mechanism is moved to a position bringing said detent into registry with the plunger.

* * * * *